July 28, 1925.
L. H. HUTTO
ELECTRIC FAN
Filed Nov. 19, 1923
1,547,875
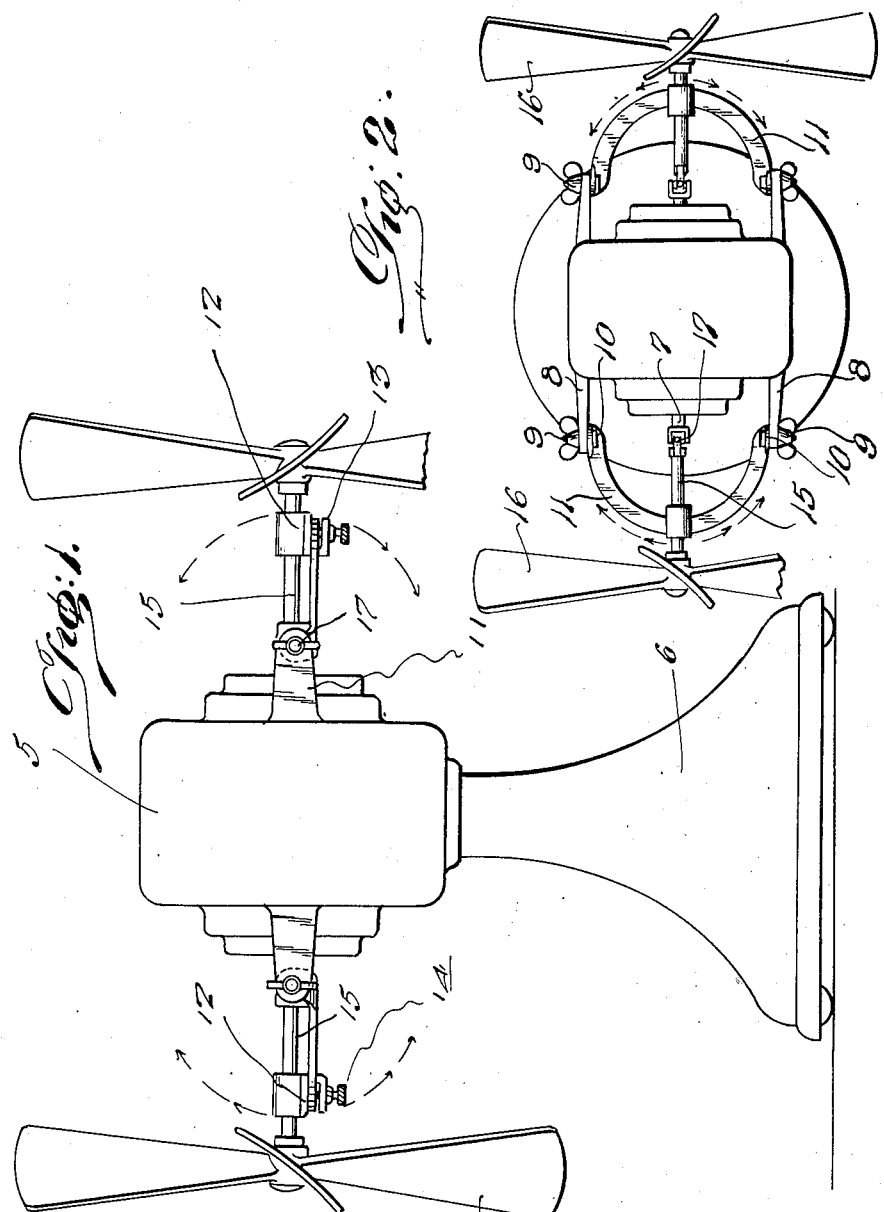
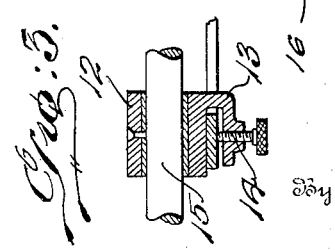
L. H. Hutto,
Inventor
Witnesses:

Patented July 28, 1925.

1,547,875

UNITED STATES PATENT OFFICE.

LACK H. HUTTO, OF BRIDGEPORT, TEXAS.

ELECTRIC FAN.

Application filed November 19, 1923. Serial No. 675,593.

*To all whom it may concern:*

Be it known that I, LACK H. HUTTO, citizen of the United States, residing at Bridgeport, in the county of Wise and State of Texas, have invented certain new and useful Improvements in Electric Fans, of which the following is a specification.

This invention relates to electric fans, and has for its primary object the provision of such a fan wherein the same comprises a pair of vertically and laterally adjustable fan blades, universally connected to the opposite projecting ends of the armature shaft of the electric motor, whereby the blasts of air may be directed to desirable points.

An additional object of my invention resides in the provision of such a fan wherein the armature shaft of the electric motor will be evenly balanced due to the fact that the fan element is operatively connected to the opposite ends of the armature shaft, the invention being also characterized by its simplicity of construction, for thereby allowing the fan blades to be adjusted whenever desired.

With the above and other objects in view, as the nature of the invention will be better understood, the same comprises the novel form, combination and arrangement of parts hereinafter more fully described, shown in the accompanying drawings and claimed.

In the drawings, wherein there is shown the most practical embodiment of the invention with which I am at this time familiar and wherein like reference characters indicate corresponding parts throughout the several views:

Figure 1 is an elevational view of an electric fan constructed in accordance with the present invention.

Figure 2 is a top plan view thereof, and

Figure 3 is an enlarged section taken thru one of the bearings of its respective fan shaft for more clearly disclosing the manner in which said fans may be adjusted laterally.

Now having particular reference to the drawings, my novel fan includes the provision of an electric motor 5, preferably mounted upon the upper end of a suitable base 6, the opposite ends of the armature shaft of said motor extending outwardly thereof.

Formed upon opposite sides of the motor casing are pairs of horizontally disposed ears or lugs 8, the lugs or ears of each pair thereof being at diametrically opposite sides of said opposite ends of the motor armature shaft 7.

Adjustably pivotally secured to each pair of lugs or ears 8 at 9, are the respective upwardly bent ends 10 of a segment 11, it being of course obvious that through the medium of the pivot connections 9—9 said segments may be swung to a desired vertical position as indicated by the dotted lines in Figure 1, for purposes hereinafter described.

For cooperation with each of said segments 11 is a shaft bearing 12 which is formed upon its lower side with a screw clamp 13 within which engages the respective segment 11, and through the medium of which said bearing 12 may be laterally adjusted upon said segment and maintained in its adjusted position through the medium of the cam screw 14 forming a part of said screw clamp.

Freely rotatable in the respective bearings 12 are shafts 15 of fan wheels 16, the inner ends of the same being joined to the projecting ends of said armature shaft 7, through the medium of any desirable form of universal joint 17.

It will be thus seen that I have provided a highly novel and useful form of electric fan and one that includes a pair of fan wheels that may be vertically or laterally adjusted for the purpose of directing the blast of air in the direction desirable.

Minor changes may be made within the invention without departing from the spirit or scope of the appended claim.

Having thus described my invention what I claim as new and desire to secure by Letters Patent is:

An electric fan comprising a motor casing, a pair of diametrically opposite supporting lugs extending outwardly from one face of the casing, an arcuate supporting member for a fan, said member having its opposite ends bent laterally and adjustably and pivotally connected with said lugs to permit said member to be adjusted up or down in a vertical direction, a bearing slidably mounted on said supporting member, a set screw carried by said bearing for holding it in various adjusted positions, a rotary fan including a shaft journaled in said bearing, and a universal connection between the inner end of said shaft and the shaft of the electric motor.

In testimony whereof I affix my signature.

LACK H. HUTTO.